Jan. 19, 1965  K. STEINBACH ETAL  3,166,278
CONTROL SYSTEM
Filed Jan. 30, 1961  3 Sheets-Sheet 1

INVENTORS
Karl Steinbach
Peter Wentzel &
Konrad Dinter
BY George H Spencer
ATTORNEY

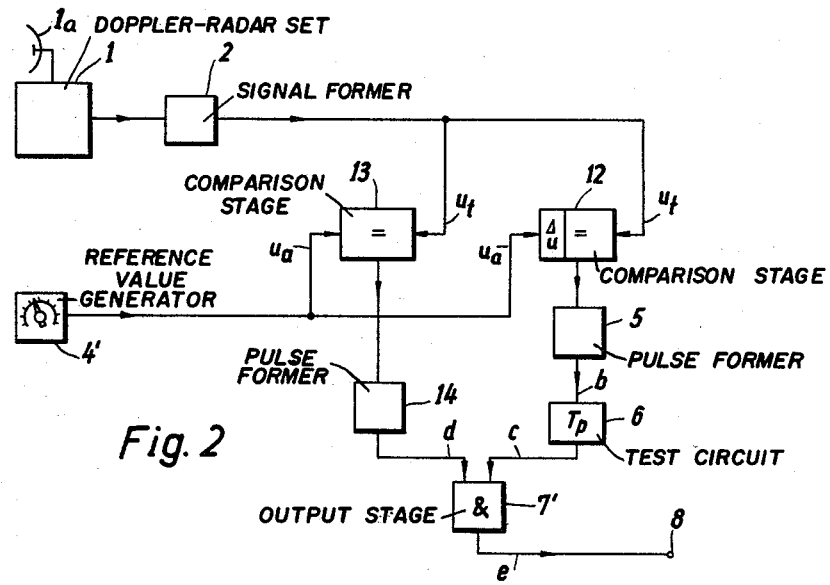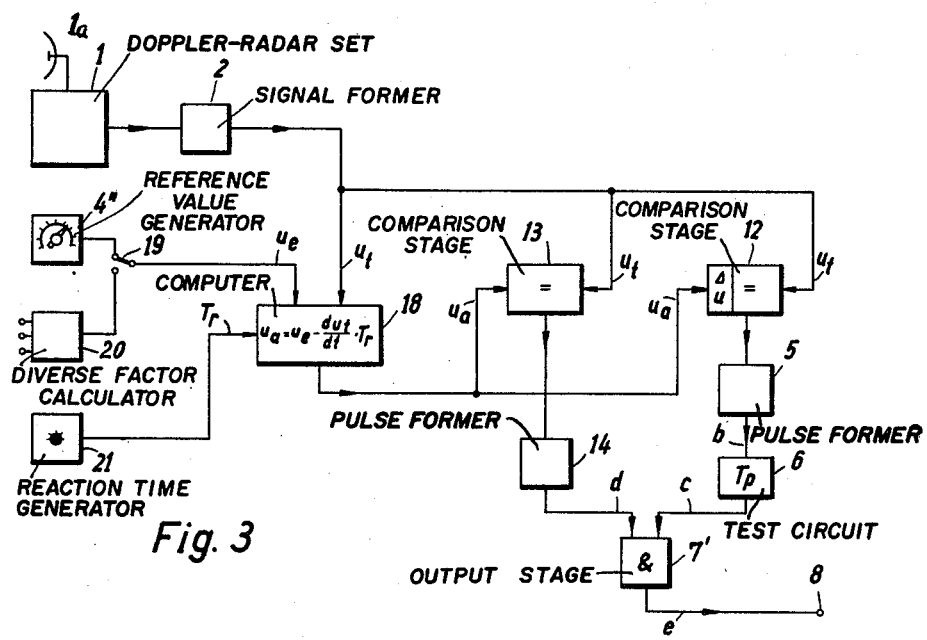

INVENTORS
Karl Steinbach
Peter Wentzel &
Konrad Dinter
BY George H Spencer
ATTORNEYS United States Patent Office 3,166,278
Patented Jan. 19, 1965

3,166,278
CONTROL SYSTEM
Karl Steinbach, Alexandria, Va., and Peter Wentzel, Munich, and Konrad Dinter, Konstanz (Bodensee), Germany, assignors, by mesne assignments, to Siemens & Halske A.G., Munich, Germany
Filed Jan. 30, 1961, Ser. No. 85,766
Claims priority, application Germany, Jan 30, 1960,
T 17,805 II/20h
21 Claims. (Cl. 246—182)

The present invention relates to a control system.

More particularly, the present invention relates to a control system which acts on a device associated with a vehicle for controlling the latter in response to the speed of the vehicle. Systems of this type may be used, for example, in the automatic control of rail brakes or car retarders in switching yards.

It is known, in the railway switching art, to control the rail brakes of releasing and braking installations in response to the speed of a car or a group of cars moving through the brake in such a manner that the brake is automatically released or opened as soon as the speed of the cars has fallen below a predetermined value. This value is generally so selected that the car will reach a given point, at which the car is to be coupled to another car, at a speed of about 1 meter per second. This low terminal speed corresponds to a very low residual energy, so that the desired speed at which the car leaves the rail brake should be obtained with the maximum possible accuracy. Actually, the determination of the proper exit speed of the car is difficult and uncertain, because not only the distance to the target but a number of tenuous factors must be taken into consideration as, for example, the particular rolling characteristics of the car or group of cars, which are dependent on atmospheric conditions, the rolling resistance of the particular section of track over which the car is to pass, and other criteria which can generally not be reduced to precise mathematical quantities. It is, therefore, all the more important to avoid as much as possible errors and inaccuracies chargeable to the control system itself.

In the development of the railway switching art, the speed of the car within the sphere of influence of the rail brake was at first determined by electromechanical means, such as a measuring device controlled by a series of contacts arranged along the rail. These electromechanical means were supplanted by more sophisticated devices, such as a continuously operating speed measuring device operating on the radar principle. In particular, the use of so-called Doppler-radar installations, which have favorable functional characteristics, has become popular. In such installations, unmodulated high frequency oscillations are emitted towards the object, and the difference between the frequency of the emitted oscillations and the frequency of the oscillations reflected by the object is used as an indication of the speed of the object. It has been found, however, that the rail brakes controlled by Doppler-radar installations are vulnerable to malfunctions which cause the brake to be released prematurely, as a result of which the exit speed of the car is too high.

It is, therefore, an object of the present invention to provide a way in which Doppler radar sets can be used without being subject to such faults. It has been found that these faults are not due to malfunction of the set itself, but are inherent in the basic measuring principle involved, i.e., the faulty operation of the radar controlled rail brakes is chargeable to the reflection characteristics of the cars or other objects of which the speed is being measured. This is so because the emitted electromagnetic ocillations are not always reflected from a single surface which at all times occupies the same position with respect to the center of gravity of the car; instead, there are a number of movable parts, such as hanging couplings, axles, bumpers, and the like, the individual reflection surfaces of which will cancel each other from time to time and at other times will themselves move at a speed which is slower than the actual speed of the car. It will be appreciated that such irregularities or such sudden deviations in the speed, as seen by the Doppler radar set, will cause the set to measure a speed which is less than that at which the brake is to be released, so that a command which causes the brake to be released will be issued prematurely. It has been sought to remedy this situation by smoothing the output of the speed measuring device by providing frequency selective means, but experience has shown that this is only partially effective. The present invention, therefore, concerns itself with a different way in which to solve the problem.

Accordingly, the present invention involves a system for controlling, in response to the speed of a vehicle, an arrangement or device affecting the vehicle, particularly, for controlling the releasing of rail brakes in switching yards equipped with automatic retarding and releasing installations, in which a continuous speed measurement is obtained by emitting and receiving high frequency oscillations, wherein there is obtained from the frequency difference between the emitted and received oscillations an output value, hereinafter represented by the symbol $u_t$, which is a function of the speed of the vehicle and wherein a command signal is released when this output value passes a predetermined reference value. The improvement according to the instant invention, which prevents the premature release of the brake, resides in a test circuit which makes it possible to produce the command signal only when the output value passes the reference value and remains past such reference value throughout a time interval which is longer than a predetermined test interval, hereinafter represented by the symbol $T_p$.

As a result, the generation of a command signal is suppressed if the output value $u_t$ goes past the reference value only for short periods of time. Thus, the present invention is based on the fact that the above mentioned faults are of short duration only, and that by introducing a suitable time delay $T_p$, it is possible to distinguish between apparent and actual instances when the value $u_t$ passes the reference value. In the following description, the value $u_t$ will be said to fall below the reference value when the radar set sees the speed of the vehicle as falling below a given reference speed, it being clear that the term "below" is used for convenience only, and that the algebraic direction in which the output value $u_t$ passes, and remains past, the reference value is immaterial.

According to various embodiments of the present invention, the different stages of the system can be so arranged as to compensate for the time delay produced by the test circuit. For example, a comparison stage may be connected ahead of the test circuit, which comparison stage has two inputs to which the value $u_t$ and a reference value $u_a$ are applied, respectively, the reference value $u_a$ corresponding to a vehicle speed $v_a$ at which the command signal to the brake releasing mechanism is to be given. The comparison stage can be so arranged as to produce an output signal as soon as the difference between $u_t$ and $u_a$ is below a predetermined value $\Delta u$. This value is preferably so selected as to correspond to a speed differential $\Delta v$ which is approximately equal to $T_p \cdot b_{max}$, where $b_{max}$ is the maximum deceleration of the vehicle, or acceleration of the vehicle if the speed control system is one which is intended to increase the vehicle speed.

Alternatively, the comparison stage may have applied to one of its two inputs a reference value $u_a + \Delta u$, which corresponds to a vehicle speed $v_a + \Delta v$ that is greater or, in the case of an acceleration system, less by an amount $\Delta v$, than the speed $v_a$ at which the command signal is to be given. The comparison stage is then so arranged as to produce an output signal when the difference between $u_a + \Delta u$ and $u_t$ is zero. As above, the value $\Delta u$, or $\Delta v$, is preferably selected so as to be equal to $T_p \cdot b_{max}$.

The test circuit is preferably arranged between the above mentioned comparison stage and the output stage of the system, i.e., the stage which actually produces the command signal. Thus, the test circuit is so arranged as to prevent the transmission of a signal coming from the comparison stage until after a time interval of a duration $T_p$ has elapsed.

Additional features of the present invention concern the calculation of the reference value $u_a$ which corresponds to the speed $v_a$ at which the command signal is to be produced. This value can be set manually. If desired, a computer may be used which, in the case of rail brake systems, takes into consideration such factors as the rolling characteristics of the car involved, the length and road characteristics of the track section over which the car is to travel, and the desired terminal velocity of the car at the time it reaches its destination. For instance, it is well known that the rolling characteristics are affected, among other factors, to a large extent by the weight of the car, so that it is possible to provide a device for calculating the reference value as a function of the car weight. The output of such computers can, of course, be connected directly to the second input of the comparison stage.

The present invention also makes it possible to compensate for the reaction time of the speed control device with which the system is associated. In the case of a rail brake, then, the system can allow for the inertia of the mechanical actuator parts of the brake. Without such compensation, there would be a time lapse between the issuance of the command signal and the instant at which the command is carried out. During this time lapse, the speed of the vehicle would fall below the intended exit speed $v_a$ to a lesser value $v_e$. The speed differential $v_a - v_e$ is not constant, but depends on the braking of the vehicle. The present invention takes this factor into consideration by utilizing the speed $v_e$, i.e., the exit speed of the vehicle after the entire system has acted on the vehicle, as the primary control value. Accordingly, means are provided for determining the instant at which the command pulse is given as a function of this speed $v_e$; these means may include a computer which calculates the reference value $u_a$ in accordance with the equation:

$$u_a = u_e - \frac{du_t}{dt} \cdot T_r$$

where $u_e$ is a value corresponding to the desired exit speed $v_e$ at which the vehicle is to travel after the system has acted on it, and $T_r$ is a value which is a function of the reaction time of the system.

In essence, the present invention resides mainly in a speed control system which comprises means for continuously measuring the speed of a vehicle, means for producing an output value which is a function of the speed, and means for comparing the output value to a reference value and for producing a command signal only when the output value passes the reference value and remains past this reference value throughout a time interval which is longer than a predetermined test interval. As a result, the system will not be misled by momentary reflections which do not represent the true speed of the vehicle.

Additional objects and advantages of the present invention will become apparent upon consideration of the following description when taken in conjunction with the accompanying drawing, in which:

FIGURES 1 to 4 are schematic diagrams of four embodiments of a system according to the present invention;

Figure 1:
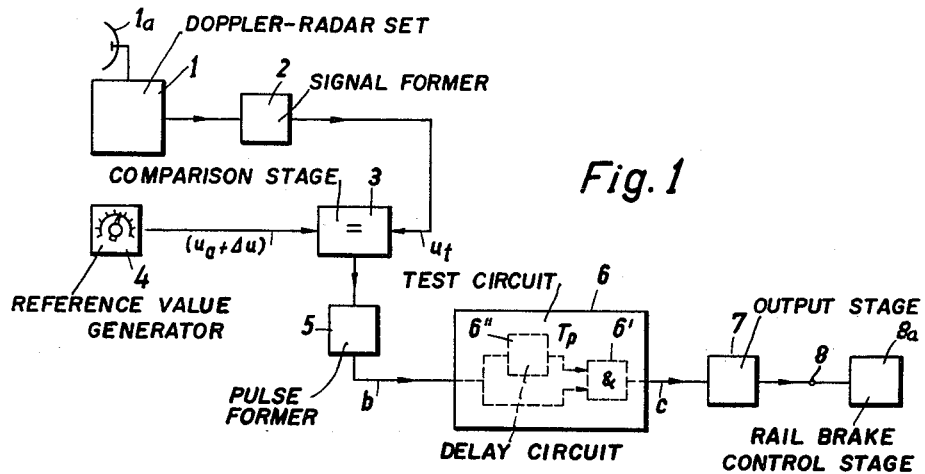

Referring now to the drawings, and to FIGURE 1 thereof in particular, the same shows a speed measuring device comprising a Doppler radar set 1 and a signal former 2. The Doppler radar set 1 has a directional antenna 1a which is arranged behind the section of track incorporating the rail brake, the reference "behind" being had with respect to the direction of travel of a car passing through the rail brake, and emitting undamped electromagnetic waves towards the car. The reflected waves which, due to the Doppler effect, will have a frequency that is higher than the frequency of the emitted waves by an amount dependent on the speed of the car, are received by the same antenna 1a, so that there will be produced in the radar set 1 an oscillation whose frequency is equal to the difference between the emitted and reflected waves. This substantially sinusoidal difference or Doppler signal is fed to the input of the signal former 2, which forms an output signal $u_t$ whose value corresponds to the measured speed $v_t$ of the car. In practice, the signal former 2 may comprise means for producing an output voltage whose amplitude is a function of the speed $v_t$; these means per se are well known and do not form any part of the present invention. Hereinafter, the output $u_t$ of the signal former 2 will be deemed to be the output of the speed measuring device as a whole.

The output $u_t$ is fed to the first input of a comparison stage 3, the second input of which is supplied with a comparison or reference value $u_a + \Delta u$. This reference value may, for example, be produced by a manually adjustable generator 4. The comparison stage 3 is so arranged that a releasing or triggering signal appears at its output as soon as $u_t - (u_a + \Delta u) = 0$, i.e., as soon as the difference between the two inputs is zero. To accomplish this result, the comparison stage may be of any conventional design, as, for example, described in "Waveforms," by Chance et al., McGraw-Hill Book Co., Inc., 1949, pages 335 to 344. In order to obtain a high degree of accuracy, the comparison stage 3 may, for example, be constituted by a voltage comparison circuit having a steep transition curve, in which the output signal is a voltage which differs from the steady-state voltage. Such comparison circuits per se are likewise known and do not form any part of the present invention.

In order to fix the response or operating point of the above described circuit even more definitely, the output may be connected to a squaring circuit or pulse former 5, such as a bistable flip-flop circuit which, when the input voltage exceeds the threshold value, rapidly changes from the "0" to the "1" position, or vice versa.

The output $b$ of the comparison stage 3 is connected, either directly or by way of the above described pulse former 5, to a test circuit 6 whose output $c$ is connected to the final output stage 7 of the control system. As soon as a releasing signal appears at the input of this output stage 7, a command signal is produced at the output 8, this output being connected to the control stage 8a of the rail brake. The test circuit 6 is so arranged that the transmission of each releasing signal is blocked throughout a time interval $T_p$ the duration of which corresponds to the testing time. This means that all releasing signals which are shorter than $T_p$ are suppressed, and of those releasing signals which are longer than $T_p$, only that portion thereof which remains after the time $T_p$ is transmitted. It will be appreciated that the circuitry which can accomplish this may take any one of a number of different forms; see, for instance, "Waveforms," cited above, FIGURE 10.3 on page 368 which illustrates a typical pulse-width selector capable of carrying out the desired so-called time selection. In the arrangement shown in FIGURE 1, the circuit 6 comprises an AND-circuit 6' to which the signal is supplied both directly and by way of a delay circuit 6". The duration of the pulse-width or test interval $T_p$ is so selected as to be longer than the above-described short time intervals throughout which the output value $u_t$ of the speed measuring device 1, 2 is less than the reference value, i.e., $T_p > t_2 - t_1$. In practice, the time interval $T_p$ may be of the order of approximately 0.075 sec.

Figure 6A:
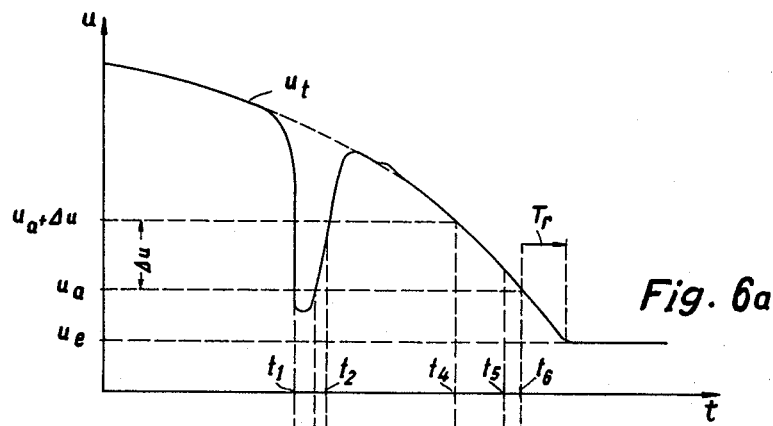
FIGURES 6a to 6e are graphs showing $u/t$ plots explanative of the system shown in FIGURES 1 to 4. The time axes of the graphs are drawn in alignment with each other.
Figure 6B:
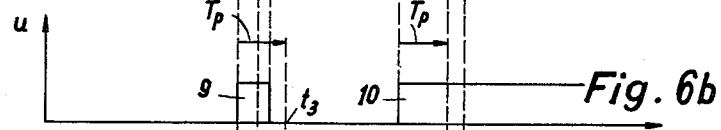
Figure 6C:
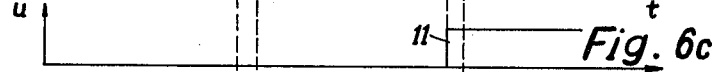

FIGURE 6a, which is not drawn to scale, is a graph showing the plot of $u_t$ as a function of time, where $u_t$ includes a fault, i.e., an incorrect speed indication, of short duration. The value $u_a$ plotted along the ordinate, corresponds to the speed $v_a$ at which the releasing signal put out by the output stage 7 should cause the rail brake control stage 8a to release the brake. It is clear that if, in the system shown in FIGURE 1, it were the reference value $u_a$ which is fed to the comparison stage 3, the signal would occur too late, by a time interval equal to $T_p$, because, as explained above, the test circuit 6 would not transmit the signal to the output stage until after the time $T_p$ has elapsed. In order to counteract this, the comparison stage 3 may be made to produce the signal as soon as $u_t$ is greater than $u_a$ by an amount equal to $\Delta u$, i.e., the triggering of the signal is not held back until the value $u_t$ has fallen to $u_a$. To this end, the reference value generator 4 feeds the value $u_a + \Delta u$, and not just the value $u_a$, to the comparison stage 3, this value $u_a + \Delta u$ corresponding to a vehicle speed of $v_a + \Delta v$, which exceeds, by $\Delta v$, the speed $v_a$ at which the release of the car is actually to take place. As stated above, this difference value $\Delta u$ should correspond to a speed difference $\Delta v$ which satisfies the equation $\Delta v = T_p \cdot b_{max}$; where $b_{max}$ is the maximum deceleration (or acceleration) of the vehicle. The test interval $T_p$ is thereby substantially compensated such that the releasing signal can be relied upon to appear not when the speed $v_a$ has been reached, but a short instant earlier, as can be seen from FIGURES 6a to 6c. FIGURE 6b shows the output signal of the pulse former 5 which corresponds, in essence, to the output signal of the comparison stage 3, and FIGURE 6c shows the output signal of the test circuit 6. It will be seen that, due to the short-time downward jag produced by the speed measuring device at the instant $t_1$, the value $u_t$ will fall below the reference value $u_a + \Delta u$, and this will produce a signal 9 at the output of the comparison stage 3. The signal 9, however, will last only a short time because the value $u_t$ will, at the instant $t_2$, once again exceed the reference value $u_a + \Delta u$. Inasmuch as the signal 9 will no longer appear at the output of the comparison stage 3, after the time interval $T_p$ has elapsed (the instant which follows $t_1$ after the elapse of the time interval $T_p$ being shown at $t_3$) no releasing signal will appear at the output of test circuit 6, as shown in FIGURE 6c. It is assumed, as set forth above, that $T_p$ will have been so selected that $t_2 - t_1$ is less than $T_p$. Only when the value $u_t$ actually falls below, i.e., only when the value of $u_t$ which is below $u_a + \Delta u$ corresponds to a speed that is actually below $v_a + \Delta v$, will a subsequent signal 10 appear at the output of comparison stage 3. This occurs at $t_4$, and the signal 10 will still appear at the output of comparison stage 3 at $t_5$, which follows $t_4$ by a time interval equal to the test interval $T_p$. At $t_5$, then, the signal 11 is transmitted by the test circuit 6 to the ouput stage 7, which then sends a command signal to the rail brake control stage 8a. It will be seen from FIGURE 6a that $t_5$ is just ahead of the instant $t_6$ at which the output value $u_t$ reaches the value $u_a$.

The system illustrated in FIGURE 2 differs from that of FIGURE 1 in that the reference value generator 4' produces the value $u_a$ and that the differential value $\Delta u$ is considered by the comparison stage 12. Thus, the comparison stage 12 produces a signal as soon as the difference between the two input values $u_t$ and $u_a$ falls below $\Delta u$, and this signal, provided it lasts longer than $T_p$, is transmitted to the output stage 7' by way of the test circuit 6. The $u/t$ plots of FIGURES 6a and 6c are thus equally applicable to the system of FIGURE 2, so that the system of FIGURE 1 could, likewise, comprise such a comparison stage 12 which cooperates with a reference value generator 4'. The system of FIGURE 2, however, makes it possible to produce the command signal exactly at the instant $t_6$ which is the precise moment at which $u_t$ becomes equal to the reference value $u_a$. To accomplish this, the system comprises a second comparison stage 13, the two inputs of which are likewise connected to receive the output value $u_t$ of the speed measuring device and the reference value $u_a$ produced by the generator 4', respectively. As soon as the difference between the two inputs becomes zero, i.e., as soon as $u_t - u_a = 0$, a signal appears at the output of comparison stage 13. This output is fed to the output stage 7' which is so arranged that it will produce an output, i.e., a command signal appearing at 8, only when signals appear at the two inputs $c$ and $d$. Accordingly, the output stage 7' acts as an AND-circuit. As in the system according to FIGURE 1, the output of the comparison stage 12 is fed to the test circuit 6 by way of a pulse former 5; the output of the comparison stage 13 may be fed to the output stage 7' by a similar bistable pulse former 14.

Figure 6D:
Figure 6E:

The operation of the system according to FIGURE 2 is shown in the graphs of FIGURES 6a to 6e, with FIGURE 6d showing the signal 1 appearing at the output of the comparison stage 13 (or the pulse former 14), and FIGURE 6e showing the command signal of the output stage 7. It will be seen from FIGURE 6d that at approximately the same instant $t_1$ at which a signal 9 appears at the output of the first comparison stage 12, due to the fact that $u_t$ falls below $u_a + \Delta u$, a signal 15 will appear at the output of the second comparison stage 13, which signal 15 will last only until the instant $t_7$ at which $u_t$ is equal to $u_a$. Since the presence of signals at both of inputs $c$ and $d$ is required to produce a command signal at the output $e$ of the stage 7', such command signal 16 will not be generated until the instant $t_6$, at which time the value $u_t$ again falls below $u_a$ and a new signal 17 appears at the output of the comparison stage 13, as shown in FIGURE 6d, and at which time a signal 11, shown in FIGURE 6c, also appears at the output of the test circuit 6, as explained above.

The system shown in FIGURE 3 is similar to the system of FIGURE 2 and additionally incorporates a computer 18 which compensates for and eliminates errors due to the reaction time $T_r$ of the rail brake. The computer 18 may be a simple analog computer of conventional design. As in the previous embodiment, a first comparison stage 12 is provided whose output signal is fed to the first input $c$ of an AND-circuit output stage 7' by way of a pulse former 5 and a test circuit 6. A second comparison stage 13 has its output connected, by way of a pulse former 14, to the other input $d$ of the output stage 7'. The use of the computer, however, is not limited to an arrangement which incorporates the two comparison stages but may also be incorporated in a system according to FIGURE 1 which includes but a single comparison stage.

The primary control value of the system of FIGURE 3 is the exit speed $v_e$ at which the car is to travel after the control system has carried out its operation, i.e., the speed at which the car is to travel as it leaves the rail brake in order to reach its destination. This speed $v_e$ will, due to the terminal reaction time $T_r$ of the rail brake and its actuating mechanism, be less than the speed $v_a$ at which the brake receives the command signal which will release the brake, see FIGURE 6a. A reference value $u_e$ corresponding to this speed $v_e$ can be produced by means of the reference value generator 4″.

FIGURE 3 shows the system as incorporating a changeover switch 19 by means of which the reference value generator 4″ can be disconnected from a diverse factor calculator 20 connected to the computer 18, which calculator 20 is adapted to calculate the value $u_e$ so as to take into consideration such factors as the rolling characteristics of the particular car involved, the road characteristics of the particular section of track involved, and the like. The calculator 20 per se is known, see, for instance, German Patent No. 612,504, dated May 6, 1935, and forms no part of the present invention.

The system further includes a reaction time generator 21 which generates and feeds into the computer 18 a value corresponding to the reaction time $T_r$ of the brake. If desired, this generator 21 can be combined with the computer 18 to form a single structural unit.

The computer 18 also has the value $u_t$ fed into it, and from the three input values, namely, $u_t$, $u_e$ and the factor corresponding to $T_r$, the reference value which is appropriate for the various conditions is calculated according to the following equation:

$$u_a = u_e - \frac{du_t}{dt} \cdot T_r$$

In this way, the reaction time of the brake $T_r$ is always precisely taken into consideration despite the varying and not precisely predictable braking conditions of the car; the calculations also take into consideration the desired exit speed $v_e$.

A system which incorporates a computer 18, such as that shown in FIGURE 3, can be carried further by utilizing the computer to counteract precisely the delay caused by the test circuit 6. In the embodiments heretofore described, the delay was compensated for by comparing the output value $u_t$ of the speed measuring device with a reference value $u_a + \Delta u$, with $\Delta u$ being so selected that the difference between the desired releasing instant $t_6$ and the actual releasing instant $t_5$ is as small as possible, and always positive, see FIGURES 1 and 6a to 6c. A command signal 16 could be obtained precisely at the instant $t_6$ by using a second comparison stage; see FIGURES 2, 3 and 6a to 6e. The computer 18 now makes it possible to obtain a command signal precisely at the instant $t_6$, even though but a single comparison stage is used.

Figure 4:
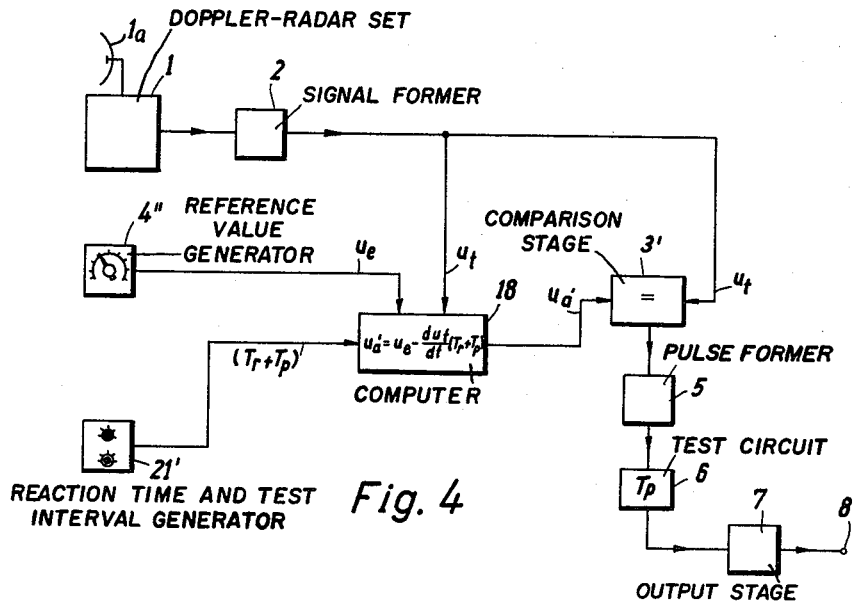

Such a system is shown in FIGURE 4 in which the computer 18 is used not only to calculate the reaction time $T_r$ of the rail brake but also to consider the test interval $T_p$ precisely. This system includes a reaction time and test interval generator 21′ which can, if desired, be combined with the computer 18 in the same structural unit, and which feeds to the computer a value which is a function of the reaction time $T_r$ and of the test interval $T_p$. The three input values to the computer 18, namely, $u_t$, $T_r + T_p$, and $u_e$ are then combined into a new reference value $u_a′$ according to the following equation:

$$u_a' = u_e - \frac{du_t}{dt} \cdot (T_r + T_p)$$

The value $u_a′$ is fed to the second input of the comparison stage 3′, to the first input of which the value $u_t$ is fed. The comparison stage 3′ is similar to the previously described stages 3, 13, in that it will produce an output signal as soon as the difference between $u_t$ and $u_a′$ becomes zero. This signal is fed to the output stage 7 via the pulse former 5 and the test circuit 6, as described above, so that a command signal will appear at 8 at the appropriate moment.

By virtue of the above arrangement, the delay caused by the test interval is precisely compensated for by making proper use of the output value $u_t$ in the computer 18.

Figure 5:
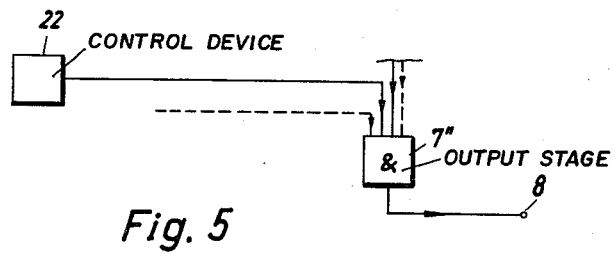
FIGURE 5 is a schematic diagram of a modification of the output stage incorporated in any of the above systems.

It is also within the scope of the present invention to trigger the command signal not only by the output value $u_t$ of the speed measuring device, but also by other reference values or other operating conditions. Such an arrangement is shown in FIGURE 5 in which the output stage 7″, in addition to being connected to any one of the systems described above, has one or more inputs which are connected to hand-operated or automatic control devices 22 which may be in the nature of monitoring devices, feelers, rail contacts, control signals, or the like, the arrangement being, for example, such that a command signal is produced when a signal appears at all of the inputs.

It will be appreciated that the schematic block diagrams of FIGURES 1 to 5 are only illustrative and not limitative of the present invention, inasmuch as the various functions accomplished by the individual component parts may be carried out in any one of a number of different ways. For instance, the condition $$u_t = u_e - \frac{du_t}{dt} \cdot T_r$$

FIGURE 3, can be determined by providing a comparison stage in which the input values $u_e$ and $$u_t + \frac{du_t}{dt} \cdot T_r$$

are compared.

Also, it will be appreciated that the present invention is not limited to a control system for rail brakes, but is equally applicable for other uses in which the control problems similar to the ones involved in a rail brake system arise.

It will be understood that the above description of the present invention is susceptible to various modifications, changes and adaptations, and the same are intended to be comprehended within the meaning and range of equivalents of the appended claims.

We claim:

1. In a system for controlling the speed of a vehicle, the combination which comprises: means for continuously measuring the speed of the vehicle, said means including a device for emitting high frequency oscillations towards the vehicle and receiving the oscillations reflected back from the vehicle; means for obtaining from the frequency difference between the emitted and received oscillations an output value $u_t$ which is a function of the speed of the vehicle; means for producing a reference value; means for comparing said output value to said reference value and for producing an output signal whenever said output value passes said reference value; and means for producing a vehicle speed control command signal only when said comparing means produce said output signal and continue to produce said output signal throughout a time interval which is longer than a predetermined test interval $T_p$, said means for producing said command signal comprising a test circuit for preventing the formation of said command signal until after said comparing means have produced said output signal for a time interval equal to said test interval $T_p$.

2. The combination defined in claim 1, further comprising means for compensating for the time delay caused by said comparing means.

3. The combination defined in claim 1 wherein said means for producing said reference value are manually adjustable.

4. The combination defined in claim 1 wherein said means for producing said reference value comprise a reference value generator which produces a reference value $u_a$ corresponding to the speed of the vehicle at which said command signal is to be produced, and wherein said comparing means comprise a comparison stage having two inputs to which said reference value $u_a$ and said output value $u_t$ are applied, respectively, said comparison stage producing an output signal as soon as the difference between $u_a$ and $u_t$ is less than a predetermined value $\Delta u$.

5. The combination defined in claim 4 wherein said value $\Delta u$ corresponds to a speed differential $\Delta v$ which is equal to approximately $T_p \cdot b_{max}$, wherein $b_{max}$ is the maximum deceleration or acceleration of the vehicle.

6. The combination defined in claim 1 wherein said means for producing said reference value comprise a reference value generator which produces a reference value $u_a + \Delta u$ corresponding to a vehicle speed $v_a + \Delta v$ that differs by $\Delta v$ from the speed $v_a$ at which the command signal is to be produced, and wherein said comparing means comprise a comparison stage having two inputs to which said reference value $u_a + \Delta u$ and said output value $u_t$ are applied respectively, said comparing means producing an output signal as soon as the difference between $u_a + \Delta u$ and $u_t$ is zero.

7. The combination defined in claim 6 wherein said value $\Delta u$ corresponds to a speed differential $\Delta v$ which is equal to approximately $Tp \cdot b_{max}$, wherein $b_{max}$ is the maximum deceleration or acceleration of the vehicle.

8. The combination defined in claim 1 wherein said means for producing said command signal further comprise an output stage having two inputs to which the output signal of said comparing means and the output signal of said test circuit are applied, respectively, said output stage producing said command signal when both said output signals are present.

9. The combination defined in claim 1 wherein said means for producing said reference value comprise a reference value generator which produces a reference value $u_a$ corresponding to the speed of the vehicle at which said command signal is to be produced, and wherein said comparing means comprise first and second comparison stages each having two inputs to which said reference value $u_a$ and said output value $u_t$ are applied, respectively, said first comparison stage producing an output signal as soon as the difference between $u_a$ and $u_t$ is less than a predetermined value $\Delta u$ and said second comparison stage producing an output signal as soon as the difference between $u_a$ and $u_t$ is zero.

10. The combination defined in claim 9, wherein said test circuit is connected to the output of said first comparison stage and wherein said means for producing said command signal further comprise an output stage having two inputs to which the output signal of said second comparison stage and the output signal of said test circuit are applied, respectively, said output stage producing said command signal only when both of its inputs are activated by output signals.

11. The combination defined in claim 10 wherein said reference value generator includes a computer which computes said reference to take into consideration diverse factors influencing the system.

12. The combination defined in claim 1 wherein said means for producing said command signal further comprise an output stage having a plurality of input means connectable to control devices as well as to said comparing means, said output stage producing said command signal upon the appearance of a signal at all of said input means.

13. The combination defined in claim 1, further comprising a device for controlling the speed of the vehicle and actuated in response to said command signal.

14. The combination defined in claim 13 wherein said means for producing said reference value comprise a computer for computing a reference value $u_a$ according to the equation $$u_a = u_e - \frac{du_t}{dt} \cdot T_r$$

where $T_r$ is the reaction time of said speed control device, and $u_e$ is a value which is a function of the speed at which the vehicle is to move after it has been subjected to the action of the system.

15. The combination defined in claim 13 wherein said means for producing said reference value comprise a computer for computing a reference value $u_a'$ according to the equation:

$$u_a' = u_e - \frac{du_t}{dt} \cdot (T_r + T_p)$$

where $T_r$ is the reaction of said speed control device, and $u_e$ is a value which is a function of the speed at which the vehicle is to move after it has been subjected to the action of the system, and wherein said comparing means comprise a comparison stage having two inputs to which said reference value $u_a'$ and said output value $u_t$ are applied, respectively, said comparison stage producing an output signal as soon as the difference between $u_a\mathrm{I}$ and $u_t$ is zero.

16. In a system for controlling the speed of a vehicle, the combination which comprises: means for continuously measuring the speed of the vehicle, said means including a device for emitting high frequency oscillations towards the vehicle and receiving the oscillations reflected back from the vehicle; means for obtaining from the frequency difference between the emitted and received oscillations an output value which is a function of the speed of the vehicle; and means for comparing said output value to a reference value and for producing a command signal only when said output value passes said reference value and remains past said reference value throughout a time interval which is longer than a predetermined test interval.

17. In a speed control system, the combination which comprises: means for continuously measuring the speed of a vehicle; means for producing an output value which is a function of said speed; and means for comparing said output value to a reference value and for producing a command signal only when said output value passes said reference value and remains past said reference value throughout a time interval which is longer than a predetermined test interval.

18. In a speed control system, the combination which comprises: means for continuously measuring the speed of a vehicle; means for producing an output value which is a function of said speed; means for producing a command signal when said output value passes a reference value; and means for preventing said last-mentioned means from producing said command signal unless said output value remains past said reference value throughout a time interval which is longer than a predetermined test interval.

19. A system for controlling, in response to the speed of a vehicle, a device which affects the speed of such vehicle, wherein a continuous speed measurement is obtained by emitting and receiving high frequency oscillations, the frequency difference between the emitted and received oscillations being utilized to produce an output value which is a function of the speed of the vehicle, and wherein a command signal is released when this output value passes a predetermined reference value, the improvement which comprises a test circuit which enables the formation of a command signal only when the output value obtained from the speed measurement remains past said predetermined reference value throughout a time interval which is longer than a predetermined test interval.

20. In a railway switching yard with automatic releasing installations, a rail brake releasing system for controlling the speed of a railway car, said system comprising in combination: means for continuously measuring the speed of the car, said means including a device for emitting high frequency oscillations towards the car and receiving the oscillations reflected back from the car; means for obtaining from the frequency difference between the emitted and received oscillations an output value which is a function of the speed of the car; and means for comparing said output value to a predetermined reference value for producing a command signal only when said output value passes said reference value and remains past said reference value throughout a time interval which is longer than a predetermined test interval.

21. In a speed controlling method, the steps of: continuously measuring the speed of a vehicle; producing an output value which is a function of the speed; and comparing the output value to a predetermined reference value and producing a command signal only when the output value passes the reference value and remains past the reference value throughout a time interval which is longer than a predetermined test interval.

References Cited by the Examiner

UNITED STATES PATENTS

| | | | |
|---|---|---|---|
| 2,749,537 | 6/56 | Loudon et al. | 340—258 |
| 2,767,393 | 10/56 | Bagno | 340—258 |
| 2,859,435 | 11/58 | Auer et al. | 343—8 |
| 2,907,022 | 9/59 | Kendall | 343—8 |
| 2,976,406 | 3/61 | Staples | 246—182 |
| 3,024,443 | 3/62 | Barker et al. | 340—62 X |

FOREIGN PATENTS

| | | |
|---|---|---|
| 753,069 | 7/56 | Great Britain. |
| 816,163 | 7/59 | Great Britain. |

LEO QUACKENBUSH, *Primary Examiner.*

LEO LEONING, JAMES S. SHANK, *Examiners.*